US006829218B1

(12) United States Patent
Chen et al.

(10) Patent No.: US 6,829,218 B1
(45) Date of Patent: Dec. 7, 2004

(54) HIGH SPEED WEIGHTED FAIR QUEUING SYSTEM FOR ATM SWITCHES

(75) Inventors: Chien Chen, Holmdel, NJ (US); Linhai He, El Cerrito, CA (US); Albert Kai-sun Wong, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/153,352

(22) Filed: Sep. 15, 1998

(51) Int. Cl.[7] ............................................. H04L 12/26
(52) U.S. Cl. ................................. 370/230; 370/395.21
(58) Field of Search ................................. 370/230, 234, 370/230.1, 395.1, 397, 395.21, 395.3, 395.41, 395.51, 412

(56) References Cited

U.S. PATENT DOCUMENTS

| | | | | |
|---|---|---|---|---|
| 4,616,359 | A | | 10/1986 | Fontenot ........................ 370/60 |
| 5,179,556 | A | | 1/1993 | Turner ........................ 370/94.1 |
| 5,280,470 | A | | 1/1994 | Buhrke et al. ................. 370/13 |
| 5,457,687 | A | | 10/1995 | Newman .................... 370/85.3 |
| 5,535,201 | A | | 7/1996 | Zheng ........................ 370/60.1 |
| 5,541,926 | A | | 7/1996 | Saito et al. ................... 370/94.2 |
| 5,577,035 | A | | 11/1996 | Hayter et al. ................. 370/60 |
| 5,583,861 | A | | 12/1996 | Holden ........................ 370/395 |
| 5,675,576 | A | | 10/1997 | Kalampoukas et al. ...... 370/232 |
| 5,689,508 | A | * | 11/1997 | Lyles ........................... 370/391 |
| 5,694,554 | A | | 12/1997 | Kawabata et al. ........... 395/250 |
| 5,737,313 | A | | 4/1998 | Kolarov et al. .............. 370/234 |
| 5,737,314 | A | | 4/1998 | Hatono et al. ............... 370/235 |
| 5,748,614 | A | | 5/1998 | Wallmeier ................... 370/235 |
| 5,754,530 | A | | 5/1998 | Awdeh et al. ............... 370/232 |
| 5,802,040 | A | | 9/1998 | Park et al. ................... 370/232 |
| 5,805,577 | A | | 9/1998 | Jain et al. .................... 370/234 |
| 5,805,599 | A | | 9/1998 | Mishra et al. ............... 370/468 |
| 5,812,527 | A | | 9/1998 | Kline et al. .................. 370/232 |
| 5,864,540 | A | * | 1/1999 | Bonomi et al. .............. 370/235 |
| 5,901,147 | A | | 5/1999 | Joffe ............................ 370/412 |
| 5,933,425 | A | | 8/1999 | Iwata .......................... 370/351 |
| 5,949,789 | A | * | 9/1999 | Davis et al. | |
| 5,956,340 | A | * | 9/1999 | Afek et al. .................. 370/412 |
| 5,959,993 | A | | 9/1999 | Varma et al. ................ 370/397 |
| 6,038,217 | A | * | 3/2000 | Lyles .......................... 370/233 |
| 6,064,651 | A | * | 5/2000 | Rogers et al. .............. 370/233 |
| 6,064,677 | A | * | 5/2000 | Kappler et al. ............. 370/414 |
| 6,069,872 | A | | 5/2000 | Bonomi et al. ............. 370/236 |
| 6,072,775 | A | | 6/2000 | Ikeda .......................... 370/236 |
| 6,091,730 | A | * | 7/2000 | Biegaj et al. ............. 370/395.2 |
| 6,198,723 | B1 | * | 3/2001 | Parruck et al. ........... 370/230.1 |
| 6,408,005 | B1 | * | 6/2002 | Fan et al. .................... 370/412 |

OTHER PUBLICATIONS

U.S. patent application Ser. No. 08/299,472, Wong, filed Aug. 31, 1994.

(List continued on next page.)

*Primary Examiner*—Alpus H. Hsu
*Assistant Examiner*—Toan D. Nguyen

(57) ABSTRACT

Methods and apparatus for an ATM network for implementing a fair servicing of all connections during a back-logged condition through the use of a weighted fair queuing technique. The system is particularly suited for systems where the packets/cells are of a fixed size. Although some important approximations are made in the proposed implementation, all of the properties of an ideal weighted fair queuing algorithm are preserved. The sorting methods and apparatus are advantageous in that it is possible to maintain appropriate servicing of connections without sorting all of the individual connections. This may be accomplished by pre-sorting each of the individual virtual circuit connections into a finite number of predetermined bins according to a weight associated with the connection. Thereafter, only the bins need be sorted without having to sort each of the individual connections. Further aspects of the invention include storing the bins in a matrix with an offset value dependent upon the current potential of the bin. In this manner, the overall sorting required to determine the next connection to service is substantially reduced. Accordingly, the invention is suitable for implementations having transmission speeds of multiple gigabits-per-second.

18 Claims, 2 Drawing Sheets

OTHER PUBLICATIONS

U.S. patent application Ser. No. 09/033,030, He et al., filed Mar. 2, 1998.

Slobodan S. Petrovic, "ABR Service in ATM Networks: Performance Comparison between Adaptive Stochastice and ERICA Flow Control Schemes with Guaranteed Minimum Cell Rate," Proceedings 23$^{rd}$ Annual Conference on Local Networks, IEEE, 1998.

W. Melody Moh and Madhavi Hegde, "Evaluation of ABR Congestion Control Protocols for ATM LAN and WAN," Proceedings of the 1996 International Conference on Network Protocol, IEEE, 1996.

Chen–Khong Tham and Wee–Seng Soh, "Multi–service Connection Admission Control using Modular Neural Networks," Proceedings of the 1998 17$^{th}$ Annual IEEE Conference on Computer Communication, INFOCOM, IEEE, 1998.

European Search Report dated Nov. 18, 2002.

Fabio M. Chiussi and Andrea Francini, *Implementing Fair Queuing in ATM Switches: The Discrete Rate Approach*, Proceedings of the IEEE INFOCOM '98, Mar. 29, 1998.

Jon C.R. Bennett, and Hui Zhang, *Hierarchical Packet Fair Queuing Algorithms*, IEEE/ACM Transactions on Networking, vol. 5. No. 5, Oct. 1997.

Hideyuki Shimonishi, and Hiroshi Suzuki, *Performance Analysis of Weighted Round Robin Cell Scheduling and Its Improvement in ATM Networks*, IEICE Trans. Commun. vol. E81–B No. 5, May 1998.

Fabio M. Chiussi, Andrea Francini, and Joseph G. Kneuer, *Implementing Fair Queueing in ATM Switches—Part 2: Logarithmic Calendar Queue*, Global Telecommunications Conference, Nov., 1997.

Andreas Ermedahl, Hans Hansson, Mikael Sjödin, *Response–Time Guarantees in ATM Networks*, 1997 IEEE.

Mei–Hwey Hou and Chienhua Chen, *Service Disciplines for Guaranteed Performance Service*, IEEE, 1997.

\* cited by examiner

HIGH SPEED WEIGHTED FAIR QUEUING SYSTEM FOR ATM SWITCHES

FIELD OF THE INVENTION

The invention relates generally to asynchronous transfer mode (ATM) networks and, more particularly, to high speed weighted queuing systems for ATM switches.

BACKGROUND

Weighted fair queuing, (also known as packetized general processor sharing (PGPS), may be come important in the next generation of ATM switching system and routers in order to fairly share bandwidth while allowing for a guaranteed minimum delay to individual connections sharing a particular transmission facility. However, to date, the implementation of weighted fair queuing algorithms have been problematic and difficult to scale to a large number of connections. For example, in conventional weighted fair queuing, the complexity of an ideal implementation is O(N)+O(logN) where N is the number of circuits, O(N) represents the recalculation for all head-of-line packets for all circuits, and O(logN) is the amount of calculations involved in resorting all of the reference finishing times. The next generation of ATM switches is expected to include tens of thousands of connections and operate at multi-gigabit rates. Accordingly, a scalable, highly efficient implementation of a weighted fair queuing algorithm is necessary.

SUMMARY OF THE INVENTION

The present invention provides improved algorithms for performing queuing in an ATM switch. In particular, the invention provides a highly efficient implementation of a weighted fair queuing algorithm in an ATM switch where the packets are of a fixed size. Although some important approximations are made in the proposed implementation, all of the properties of an ideal weighted fair queuing algorithm are preserved. The sorting algorithms in accordance with the present invention are advantageous in that it is possible to maintain appropriate servicing of connections without sorting all of the individual connections. This may be accomplished by presorting each of the individual virtual circuit connections into a finite number of predetermined bins according to a weight associated with the connection. Thereafter, only the bins need be sorted without having to sort each of the individual connections. Accordingly, the invention is suitable for implementations having transmission speeds of multiple gigabits-per-second.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
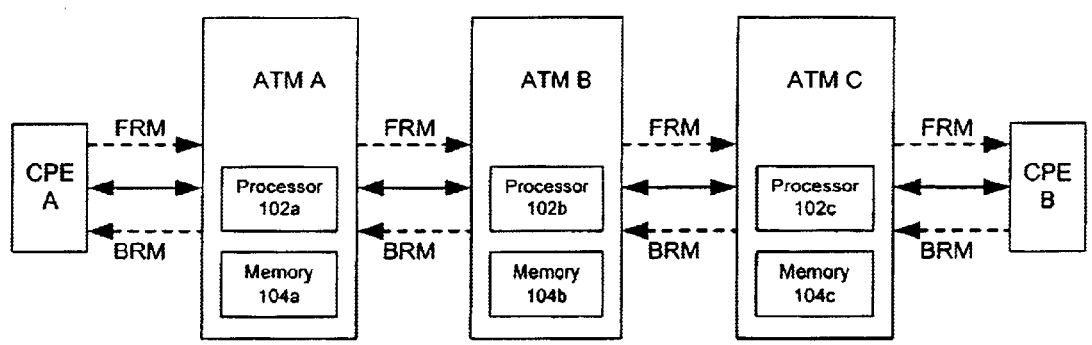
FIG. 1 illustrates an embodiment of an ATM network.

Referring to FIG. 1, an ATM network 1 may include, for example, a plurality of interconnected ATM switches ATM A, ATM B, and ATM C interconnecting one or more pieces of equipment located on the customer's premises (e.g., customer premises equipment A (CPE A) and customer premises equipment B (CPE B)). As shown in FIG. 1, each ATM switch may include a processor 102 and a memory 104. For instance, ATM A may include processor 102$a$ and memory 104$a$, ATM B may include processor 102$b$ and memory 104$b$, and ATM C may include processor 102$c$ and memory 104$c$. The ATM network 1 may be configured to carry data over a wide area such as an entire country and/or globally. The data rate across the ATM network 1 is variable and data may be backed-up in one or more queues in each of the ATM switches.

Each of the individual ATM switches ATM A, ATM B, ATM C, may include an output queue for storing received cells prior to transmission on one or a plurality of output connections. Each output queue may, from time to time, become back-logged due to congestion on a particular output connection. While the circuit is back-logged, cells cannot be sent out over the circuit without loss of the cell. Accordingly, cells for each of the various connections begin to build-up in the output queue. When capacity becomes available on the output connection, a choice must be made as to which cells to transmit. This choice may be made, for example, using one or more algorithms described below.

A first exemplary embodiment of the weighted fair queuing algorithm may store a connection potential $P_i$ for each back-logged circuit. The connection potential $P_i$ is the amount of service that the connection has received normalized to the weight of a particular connection. For any given instant in time for which service is available, the circuit with the minimum connection potential is serviced. When a circuit newly becomes back-logged, its potential must be initialized. This may be done by keeping track of a system potential $P_s$ that is used for the initial value of $P_i$ for any connection that newly becomes back-logged. To maintain fairness, the system potential should always be kept within the range of the connection potentials of the back-logged connections. In one exemplary embodiment, the connection potential of the circuit which newly becomes backlogged is set to be the connection potential of all other virtual circuits within the bin which have the same connection weight. Where the bin is empty, it may be desirable to set the connection potential of the virtual circuit to be: a) the average of the connection potentials of the two bins having the closest weight to the newly non-empty bin, b) the potential of the bin having the next lowest or next highest weight. The object is to service the connection with the lowest normalized past service (i.e., potential $P_i$). In this manner, the all connection are maintained to within a narrow normalized past service range and the system is fair.

An additional mechanism is needed for a new connection which has just been initiated. If the connection potential is set at zero, the new connection will receive all of the service. Accordingly, a weighting mechanism is required for new connections to assign an initialization potential to a new connection which is comparable to the existing connection potentials. Thereafter, the new connection is serviced like all other connections in accordance with its normalized connection potential. A parameter $P_s$ may be utilized by the ATM switch to keep track of where the connection potentials are and to provide a reference for initializing the potentials of newly back-logged circuits.

Using the above described method, the complexity for sorting N connections is O(logN) plus some overhead for updating the system potential. A further improvement may be made where there are only a finite number of discrete potentials such as when one cell is transmitted, the potential varies by a discrete amount.

Figure 2:
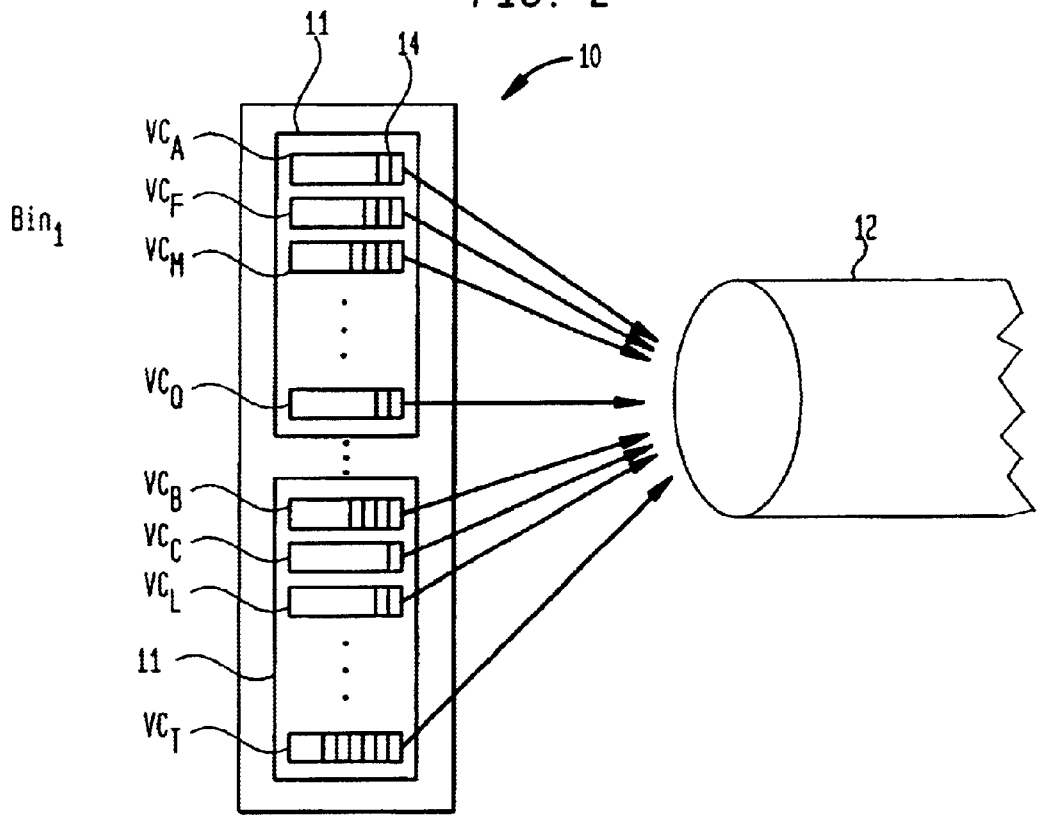
FIG. 2 is a block diagram illustrating an embodiment of an output queue of an ATM switch.

Referring to FIG. 2, in one exemplary embodiment the output queue 10 for a particular output connection 12 may have any number of bins (e.g., Bin X–Bin N). In one exemplary embodiment, there are 64 bins which may correspond to 64 different weights. Thus, with reference to the description above, with 64 bins, the finite set of values for Wi is 64. Each bin may include a plurality of separate output queues VCa, VCf, . . . , each corresponding to a different virtual circuit to be output across output connection 12. Each of the separate output queues may contain one or more cells 14 waiting to be output on the output connection 12. Each virtual circuit VCa, VCb, . . . , may be assigned a particular weight depending on the amount of relative service selected for a particular virtual circuit. In embodiments of the invention, virtual circuits with the same weight are assigned to the same Bin. For example, Bin 1 may include virtual circuits VCa, VCf, VCm, . . . , VCq which may all have the same weight. Similarly, Bin N may include virtual circuit VCb, VCc, VCl, . . . , VCt which also all may have the same weight. Each of the bins contain non-empty queues for virtual circuits having the same weight. The larger the weight of a virtual circuit, the more service may be associated with that virtual circuit. Thus, by pre-sorting virtual circuits with similar or equal weights into a predetermined number of bins, the overall performance of the switch may be substantially increased.

In the potential-based approach, every time a connection receives service (1 cell transmitted), its potential may be increased by 1/Wi, where Wi is its weight (i.e., the potential varies by a discrete amount). Where there are only a finite set of values for Wi, then for all connections with the same weight, their potentials are always incremented in the same fashion and intuitively, it is not necessary to keep track of the individual potentials and to sort them separately. In this manner, once a bin with the lowest potential is determined, it may be desirable to service all non-empty virtual circuits within that bin before resorting to find the bin with the new lowest potential. Where a empty virtual circuit within a bin becomes non-empty during servicing of a particular bin, it may be desirable to not service that virtual circuit until a new potential is recalculated.

For example, where there are K different weights allowed, then the ATM switch may include K bins for each output connection 12. Within each bin, a linked-list of all the Vcs with weight Wk that are backlogged may be maintained. When a VC with weight Wk becomes newly backlogged, it joins the weight bin with weight Wk, meaning that the potential of this VC is initialized to the potential of all other VCs in this bin. This method may be more desirable (providing a tighter fairness bound) than other methods for updating the system potential. In exemplary embodiments, a potential is determined for each bin. The bins are then sorted to find the bin having the minimum potential. Whenever the k-th weight bin is found to have the minimum potential, all connections within the bin may be served once. In this manner, the problem is converted from one that depends on the number of connections to one that depends on the number of different weights that are allowed, and hence the efficiency of the sorting process is greatly enhanced. Additionally, it becomes possible for a switch with a given processing power to handle a much faster output connection with substantially more virtual circuits.

Figure 3:
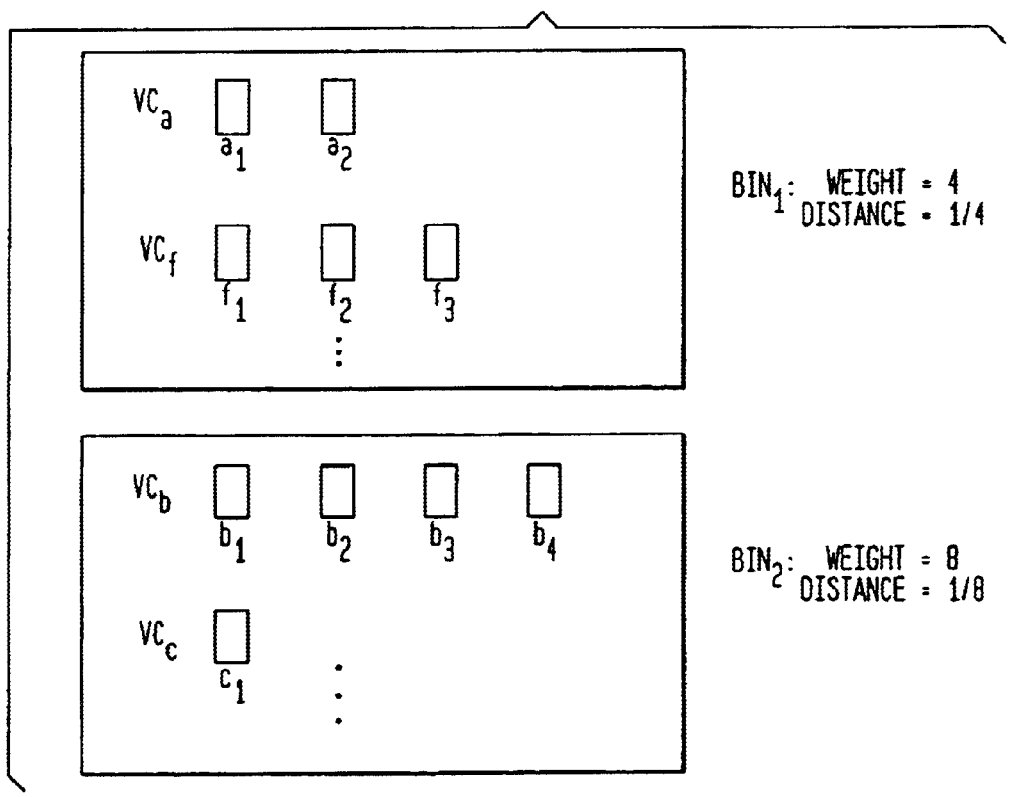
FIG. 3 illustrates an embodiment of a mapping function.

Sorting of Lead-Bins

Where we have a plurality of weighted bins, each being associated with one of a plurality of finite weights, it may be desirable to sort the bins to determine which order the bins should be serviced. FIG. 3 shows one example of the present invention for two bins: Bin 1 and Bin 2. Initially, all bins may have the same potential, e.g., potential=zero, or a potential assigned according to the weight of the bin. In some implementations, on initialization, cells contained in bins having the higher weight may be serviced first. With respect to FIG. 3, since bin 2 has a higher weight, it may be desirable, upon initialization, to send one or more cells from each non-empty virtual circuit queue in Bin 2 to the output connection 12. For example, referring to FIG. 3, cells VCb1 and VCc1 are sent to the output connection 12 first. Thereafter a new potential is calculated for Bin 2 as the current potential (0) plus the distance ($\frac{1}{8}$) such that the new potential of Bin 2=$\frac{1}{8}$.

Since Bin 1 now has the smallest potential (potential=0 which is less than $\frac{1}{8}$), Bin 1 is serviced next with one or more cells (e.g., VCa1, VCf1) from each non-empty queue in Bin 1 being sent to the output connection 12. Thereafter the potential for Bin 1 is recalculated as the current potential (0) plus the distance ($\frac{1}{4}$) such that the new potential of Bin 1=$\frac{1}{4}$.

Next the potentials among all non-empty bins are resorted. Since Bin 2 has the lowest potential $\frac{1}{8}$ versus $\frac{1}{4}$, all non-empty queues in Bin 2 may be serviced next (e.g., VCb2). Note there is no service of VCc since the queue associated with this virtual connection has become empty. Next, the new potential for Bin 2 is calculated as the current potential ($\frac{1}{8}$) plus the distance ($\frac{1}{8}$) which is equal to $\frac{1}{4}$.

Again the potential for all non-empty bins are resorted. Since Bin 1 and Bin 2 now have the same potential $\frac{1}{4}$, it may be desirable to service all non-empty queues from both Bin 1 and Bin 2 prior to recalculating and resorting. For example, cells VCa2, VCf2, and VCb3 may be sent to the output connection 12. Thereafter, the potential for Bin 1 and Bin 2 may be recalculated. For Bin 1, the new potential is the current potential $\frac{1}{4}$ plus the distance $\frac{1}{4}$ which is equal to $\frac{1}{2}$. For Bin 2, the new potential is the current potential $\frac{1}{4}$ plus the distance $\frac{1}{8}$ which is equal to $\frac{3}{8}$. Since Bin 2 now has the lowest potential, bin 2 is again serviced by sending VCb4. Once VCb4 has been sent, Bin 2 has become empty. Thereafter, Bin 1 will be serviced until Bin 2 again becomes non-empty.

As is apparent from the above operational description, since Bin 2 has the greater weight, Bin 2 receives the greatest amount of service with the service being proportional to the weight. Additionally, even though there may be four virtual connections with different numbers of cells waiting, the weighted fair queuing algorithm only needs to sort two different potentials to determine which virtual circuit queue to service next. Thus, a highly efficient and yet fair algorithm is made possible.

Storage of Pij

In yet a further aspect of the invention, it is possible to further increase the efficiency of the algorithm by organizing the data associated with the bins in memory in a predetermined arrangement. For example, the above method requires the storage of the potential values for each of the individual bins. An alternative is to keep track of a system virtual time which is a reference potential from which all of the potentials of the bins may be offset by one or more values. In this manner, all potential values associated with the bins can then be compared as offsets to the system virtual time. The value of the offsets can be deduced from the system virtual time since the progression of the potential value for each of the bin is known. Also, any potential values for two or more bins which are tied across a row can be determined by a simple operation. This alternative method of sorting requires an efficient and accurate division of the system time t. Second t may grow without bound as long as the system stays busy. (Only when the system goes) idle can t be reset to zero. When t becomes large, the division or multiplication (if high speed division is utilized to implement the table look-up) becomes complex. Also, straightforward wraparound of t is not acceptable and hence the values may need to be reset as the system approaches wrap-around condition. However, for suitable environments, the table based sorting based on offset from a system time is a highly efficient solution for sorting the bins.

Although the sorting of lead bins in a matrix arrangement may be accomplished using any suitable sorting mechanism, a two dimensional structure and algorithm may be useful. Alternatively, a three dimensional structure and algorithm may be used to store bins which have a tied potential with bins having the tied potential stored in the third dimension. For simplicity, the example given below will be shown in a two dimensional format. In this example, d may be set to the reciprocal of the weight, i.e., d=1/w. It may also be desirable to represent d by a floating point number with an n-bit mantissa and m-bit exponent forming the two sides of the matirx. As shown below, the bins may be arranged as a two-dimensional structure where d has a two bit mantissa and a two bit exponent:

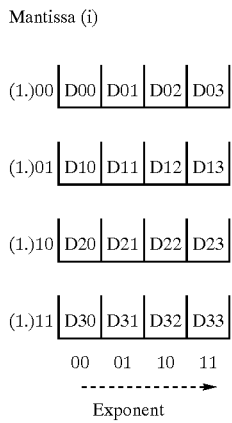

In this arrangement, the bin in the upper left hand corner (or next full bin closest thereto) of the matrix is serviced first. Thereafter, a new potential is calculated for the bin and the bin is inserted into the matrix in an appropriate location for the new potential. Thus, there is no need to resort all of the bins, only to store the bin in the appropriate location in the matrix. Accordingly, the processing necessary to determine the bin with the least potential is substantially reduced.

In an exemplary embodiment, a processor in the ATM switch (e.g., a processor 102) may be configured with a memory (e.g., a memory 104) implementing the matrix arrangement described above. Although the matrix may be accessed and maintained in any suitable manner to accomplish the above function, one technique is described below.

If k>j, then
Pij less than or equal to Pik at all times
Where t is the potential of the bin being serviced, after all non-empty weight bins with potential t are served, the system must find the next (set of non-empty weight bin(s)) with the minimum potential to serve.
For row i, consider
k=ceiling (t/l.i) (Using the shorthand notation above (l.i))

if k is divisible by $2^r$, where r is an integer, then
Pir=Pi(r−1)
otherwise, Pir>Pi(r−1)
Since if k is divisible by $2^r$, it is divisible by $2^{(r-1)}$, consequently:
Pir=Pi(r−1)=Pi(r−2)= . . . =Pi0.

In exemplary embodiments in accordance with this aspect of the invention, it is not necessary to sort all of the weighted bins. For example, it is sufficient to sort the first non-empty weight bin in each row. Where there are ties, it may be desirable to serve all of the tied bins. Further, it may be desirable to determine all non-empty bins in each winning row that are tied with the winning lead bin (i.e., the first non-empty bin on that row). Finding all the bins that are tied with the lead bin in a row is on the order of one operation since all that is required is to check the weight of the next non-empty bin Bim in row i to see if it is a tie with the first non-empty bin. If it is, then we serve bin Bim and check if Bim' (where Bim' is the next non-empty bin) is a tie with Bim. Otherwise, we are done and sort the lead bins of all rows again. Note that where the bins are presorted, since if Bim is not tied with Bij, no subsequent bin Bik, k>m can be tied with Bij.

In exemplary embodiments of the table based sorting method described above, the first step is to represent the potential for each bin as a floating point number having a mantissa and an exponent. The next step is to organize all of the bins in a memory of the ATM switch into rows (each having the same mantissa value) and columns (each having the same exponent value. In organizing the bins, it may be desirable to organize each row such that each adjacent column has a higher potential (or equal potential for a two dimensional matrix) than the preceding column in the same row. In this manner, only the lead bins in each row need be sorted. Bins with the largest weight (smallest distance) may be organized first in the row/column with bins with the smallest weight (largest distance) organized last in the rows/columns. The next step is to sort the first non-empty bin (lead bin) of each row in terms of potential. Once the table has been sorted as defined above, the next step is to service the lead bins in each of the rows and then to serve all of the non-empty bins with the same potential as the lead bin. Thereafter, the potential for each of the serviced bins is recalculated, and the serviced bins are inserted into the table in an appropriate location. In this manner, the amount of sorting is reduced by the square root of the number of bins and the number of register loads are also decreased.

Pseudo-Code

Exemplary embodiments of the present invention may be performed using methods and systems as described above. In one embodiment, the methods and systems of the present invention may be described using the following pseudo code:

Start:
system_virtual_time t=potential of bin currently being served
Queue_To_Serve=the VC queue to be served
L(i,j)=the linked list of all non-empty VC queues in weight bin Bij
(We assume that a single bit comparator is used to quickly determine the lead bin, i.e., the first non-empty bin of each row.
Cell Arrival:
Put Cell into VC in Bin Bij based on weight of VC
If VC Queue has been empty link this VC Queue to Linked List L(i,j)

If Bin Bij is Empty
   then initialize Pij to ceiling[t/Dij]*Dij
(In an alternate embodiment, Pij may simply be initialized to t, in which case it may be desirable to test for Pim>=Pij, m>j, Bim, Bij both non-empty to decide if we need to serve the next bin in a row. This should simply introduce an additional inaccuracy in potential initialization. As discussed above, the division t/Dij may grow to be problematic where the queue remains full for extended periods of time and the division makes the wraparound oft may be come more complex such that the remainder will need to be tracked for each wraparound operation.)
Cell Departure:
Send a Cell from Queue_To_Serve in weight Bin being Served Bkl
If VC Queue becomes empty remove it from Link List of VC Queues in Bkl
If VC Queue is not tail of L(k,l)
   Queue_To_Serve=next VC Queue in linked list L(k,l)
   else
   find next non-empty bin Bkm on row k
   if Pkl>=Pkm
     then {Queue_To_Serve=Head of L(k,m);
       Pkl<-Pkl+Dkl;
       return}
   else {Pkl<-Pkl+Dkl;
     Sort lead bin of all rows;
     QueueToServe=Head of L of the winning bin}

While exemplary systems and methods embodying the present invention are shown by way of example, it will be understood, of course, that the invention is not limited to these embodiments. Modifications may be made by those skilled in the art, particularly in light of the foregoing teachings. For example, it will be well known in the art that a processor (e.g., a processor 102) in each of the ATM switches in FIG. 1 implements the algorithms discussed herein. Further, each of the steps of the aforementioned embodiments may be utilized alone or in combination with steps of the other embodiments.

We claim:

1. A method of transmitting cells comprising:
sorting cells associated with a plurality of virtual circuits into a plurality of bins independent upon weights associated with the plurality of virtual circuits using a two-dimensional matrix;
sorting the bins based on connection potentials associated with the plurality of bins to determine which of the cells to transmit; and
servicing all non-empty virtual circuits within a first of the plurality of bins having the lowest of the connection potentials prior to sorting the plurality of bins.

2. The method of claim 1 including storing the connection potential for each of the bins which contain at least one backlogged virtual circuit.

3. The method of claim 1 including initializing a newly backlogged virtual circuit to a connection potential matching connection potentials of other virtual circuits having the same weight.

4. The method of claim 1 including servicing all non-empty virtual circuits within a second of the plurality of bins when the connection potential of the second bin is the same as the connection potential of the first bin.

5. The method of claim 1 comprising adjusting the connection potential of the first bin by an amount proportional to an inverse of its weight.

6. The method of claim 1, wherein each of the connection potentials indicates an amount of service received by one or more of the cells in the associated bin.

7. The method of claim 1, wherein each of the bins is associated with two or more of the virtual circuits.

8. An ATM network comprising a plurality of ATM switches interconnected via a plurality of connections, each connection having one or more virtual circuits, each ATM switch having a processor and a memory configured to sort incoming cells associated with the plurality of virtual circuits into a plurality of virtual circuit queues and for sorting the plurality of virtual circuit queues into a plurality of bins dependent upon weights associated with the plurality of virtual circuits using a two-dimensional matrix where bins are organized according to their associated connection potentials dependent upon a weight associated with the virtual circuit, wherein cells are output from each of the ATM switches in accordance with connection potentials associated with the bins.

9. The ATM network of claim 8 wherein the processor and memory are configured to service all virtual circuits associated with a single bin having the lowest connection potential.

10. The ATM network of claim 9 wherein the processor and memory are configured to sort the bins to determine a new first bin with a connection potential lower than all other bins after at least one cell is sent from each virtual circuit within a first bin which currently has a connection potential lower than or equal to all other bins.

11. The ATM network of claim 9, wherein the processor and memory are configured to adjust the connection potential of the single bin by an amount proportional to an inverse of its weight.

12. The ATM network of claim 8, wherein each of the connection potentials indicates an amount of service received by one or more of the cells in the associated bin.

13. The ATM network of claim 8, wherein each of the bins is associated with two or more of the virtual circuits.

14. An ATM switch having a processor and a memory configured to sort incoming cells associated with a plurality of virtual circuits into a plurality of virtual circuit queues and for sorting the plurality of virtual circuit queues into a plurality of bins dependent upon weights associated with the plurality of virtual circuits using a two-dimensional matrix where bins are organized according to their associated connection potentials dependent upon a weight associated with the virtual circuit wherein cells are output from each of the ATM switches in accordance with connection potentials associated with the bins.

15. The ATM switch of claim 14, wherein each of the connection potentials indicates an amount of service received by one or more of the cells in the associated bin.

16. The ATM switch of claim 14, wherein each of the bins is associated with two or more of the virtual circuits.

17. The ATM switch of claim 14 wherein the processor and memory are configured to service all virtual circuits associated with a single bin having the lowest connection potential.

18. The ATM switch of claim 17, wherein the processor and memory are configured to adjust the connection potential of the single bin by an amount proportional to an inverse of its weight.

* * * * *